United States Patent
Diosi et al.

(10) Patent No.: US 8,162,793 B2
(45) Date of Patent: Apr. 24, 2012

(54) PLANETARY GEARSET

(75) Inventors: Gabor Diosi, Friedrichshafen (DE); Josef Haupt, Tettnang (DE); Martin Brehmer, Constance (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 871 days.

(21) Appl. No.: 12/280,218

(22) PCT Filed: Feb. 14, 2007

(86) PCT No.: PCT/EP2007/051430
§ 371 (c)(1),
(2), (4) Date: Aug. 21, 2008

(87) PCT Pub. No.: WO2007/099036
PCT Pub. Date: Sep. 7, 2007

(65) Prior Publication Data
US 2009/0253545 A1    Oct. 8, 2009

(30) Foreign Application Priority Data
Mar. 2, 2006 (DE) .......................... 10 2006 009 622

(51) Int. Cl.
*F16H 57/08* (2006.01)
(52) U.S. Cl. ....................................... 475/331; 475/159
(58) Field of Classification Search .................. 475/159, 475/331
See application file for complete search history.

(56) References Cited

U.S. PATENT DOCUMENTS

| | | | |
|---|---|---|---|
| 3,212,358 A * | 10/1965 | De Lalio | 477/69 |
| 3,899,938 A * | 8/1975 | Crabb | 475/86 |
| 4,368,652 A * | 1/1983 | Windish | 475/116 |
| 4,400,998 A | 8/1983 | Bookout et al. | |
| 5,700,221 A | 12/1997 | Mizuta | |
| 6,663,531 B2 | 12/2003 | Skrabs | |
| 6,758,786 B2 | 7/2004 | Lepelletier | |
| 2004/0077449 A1 | 4/2004 | Biermann et al. | |

FOREIGN PATENT DOCUMENTS

| | | |
|---|---|---|
| DE | 43 41 953 A1 | 1/1995 |
| DE | 100 14 464 A1 | 9/2001 |
| DE | 10 2005 031 066 A1 | 2/2007 |
| EP | 0 274 874 A2 | 7/1988 |
| EP | 0 851 149 A1 | 12/1997 |
| JP | 09-0686262 | 3/1997 |
| JP | 2002-021946 | 1/2002 |
| JP | 2004-019842 | 1/2004 |
| JP | 2004-044723 | 2/2004 |
| JP | 2005-147285 | 6/2005 |
| WO | WO-2007/003306 A1 | 1/2007 |

* cited by examiner

*Primary Examiner* — Ha D. Ho
(74) *Attorney, Agent, or Firm* — Davis & Bujold, P.L.L.C.

(57) ABSTRACT

A planetary gearset (2) consisting of a planetary gear carrier (4) that holds planetary gears (5) with a first and a second carrier plate (4b, 7), each having respective bores (4d, 7a) to receive planetary gear bolts (6) that can be fixed axially. It is proposed that the planetary gear carrier is connected in a rotationally fixed manner by the second carrier plate to a torque-transmitting component (8) of an adjacent shift element (3).

12 Claims, 4 Drawing Sheets

PLANETARY GEARSET

The invention concerns a planetary gearset according to the preamble of claim 1—known from EP 0 274 874 B1.

The known planetary gearset consists of a planetary gear carrier which holds a plurality of planetary gears distributed around its circumference, which are mounted on the planetary gear carrier by way of planetary gear bolts. For this, the planetary gear carrier has two walls parallel to one another, a first and a second carrier plate, in which there are aligned bores to receive the planetary gear bolts. The planetary gear bolts are axially fixed in the planetary gear carrier by a stepped bore with an axial abutment and by a securing ring provided in a carrier plate. The planetary gears have teeth and are in connection with other gear wheels, a sun gear and a ring gear (not shown). The planetary gears are mounted on the planetary gear bolts by way of rollers or slide bearings and these bearing points have to be lubricated. For this purpose, an axial bore accessible from outside is provided in the planetary gear bolts, whose inlet is associated with an oil collector plate.

A planetary gearset with an axially adjacent shift element, namely a disk clutch, is known from EP 0 851 149 A1. In this case too, the planetary gearset consists of a planetary gear carrier holding planetary gears, which mesh with an inner sun gear and an outer ring gear. The planetary gears are mounted by way of planetary gear bolts in carrier plates of the planetary gear carrier, one carrier plate being connected to an outer disk carrier of the adjacent shift element. At the same time, the outer disk carrier is formed as a clutch cylinder in which a clutch piston is fitted and able to slide and which, together with the clutch cylinder, forms a pressure chamber located on the side of the disk set remote from the planetary gearset.

The purpose of the present invention is to connect a planetary gearset of the type mentioned at the start, to an adjacent shift element in a space-saving, simplified and more cost-effective manner.

This objective is in the first place achieved by virtue of the characterizing features of claim 1. According to the invention, a carrier plate of the planetary gear carrier is connected in a rotationally fixed manner to a torque-transmitting component of the adjacent shift element, this preferably being a disk carrier of a disk clutch. The carrier plate of the planetary gear carrier and the disk carrier, in particular an outer disk carrier, can preferably be made in one piece, i.e., integrally as a single component. This gives the advantage of a compact structure for the coupling of the adjacent shift element to the planetary gearset.

To fix the planetary gear bolts axially, securing means in the carrier plates are provided in the form of securing rings and stepped bores. Alternatively, the planetary gear bolts can be axially secured to the carrier plates by crimping.

In another advantageous design of the invention an annular cylinder is connected in a rotationally fixed manner to the carrier plate that supports the disk carrier, preferably by way of a rivet joint. The annular cylinder has inside it an axially sliding annular piston that with the annular cylinder forms a pressure chamber, which is supplied with pressure oil via a duct system to actuate the shift element, i.e., to apply an axial force on the disk set. For this, in a further advantageous feature of the invention, an outer pressure ring is arranged on the piston, whose diameter corresponds to that of the disk set. The annular cylinder also has the advantage that with its bottom it can serve as the axial abutment for the planetary gear bolts so that only one further axial abutment for the opposite direction is needed. Advantageously, this can consist of a securing ring in the first or second carrier plate of the planetary gear carrier.

In an another advantageous feature of the invention, the bottom of the annular cylinder has an axially directed recess and so forms a lubrication oil chamber which on its radially inner inlet side, communicates with a lubrication oil supply system and on its radially outer outlet side communicates with axial bores in the planetary gear bolts, from where the lubrication oil passes, via radial bores, to the lubrication points of the planetary gears.

As a further advantageous feature of the invention, the annular cylinder has a radially inner, extended cylindrical wall which, together with the rear side of the piston, forms a pressure equalization chamber. This is supplied with lubrication oil via a bore in the extended cylindrical wall, i.e., not under pressure, so that for the piston an equalization of the dynamic pressure, i.e., a speed-independent build-up of pressure in the clutch, takes place.

Thus, the annular cylinder can fulfill the following functions: 1. axial abutment for the planetary gear bolts; 2. pressure cylinder in combination with the piston for actuating the shift element; 3. oil collector plate with the formation of a lubrication oil chamber for the supply of lubrication oil to lubrication points of the planetary gears, and 4. part of the pressure equalization chamber. This gives the advantage of an axially shorter structure and a close connection of the planetary gearset and the shift element.

Example embodiments of the invention are illustrated in the drawing and will be described in more detail below. The drawing shows:

Figure 1:
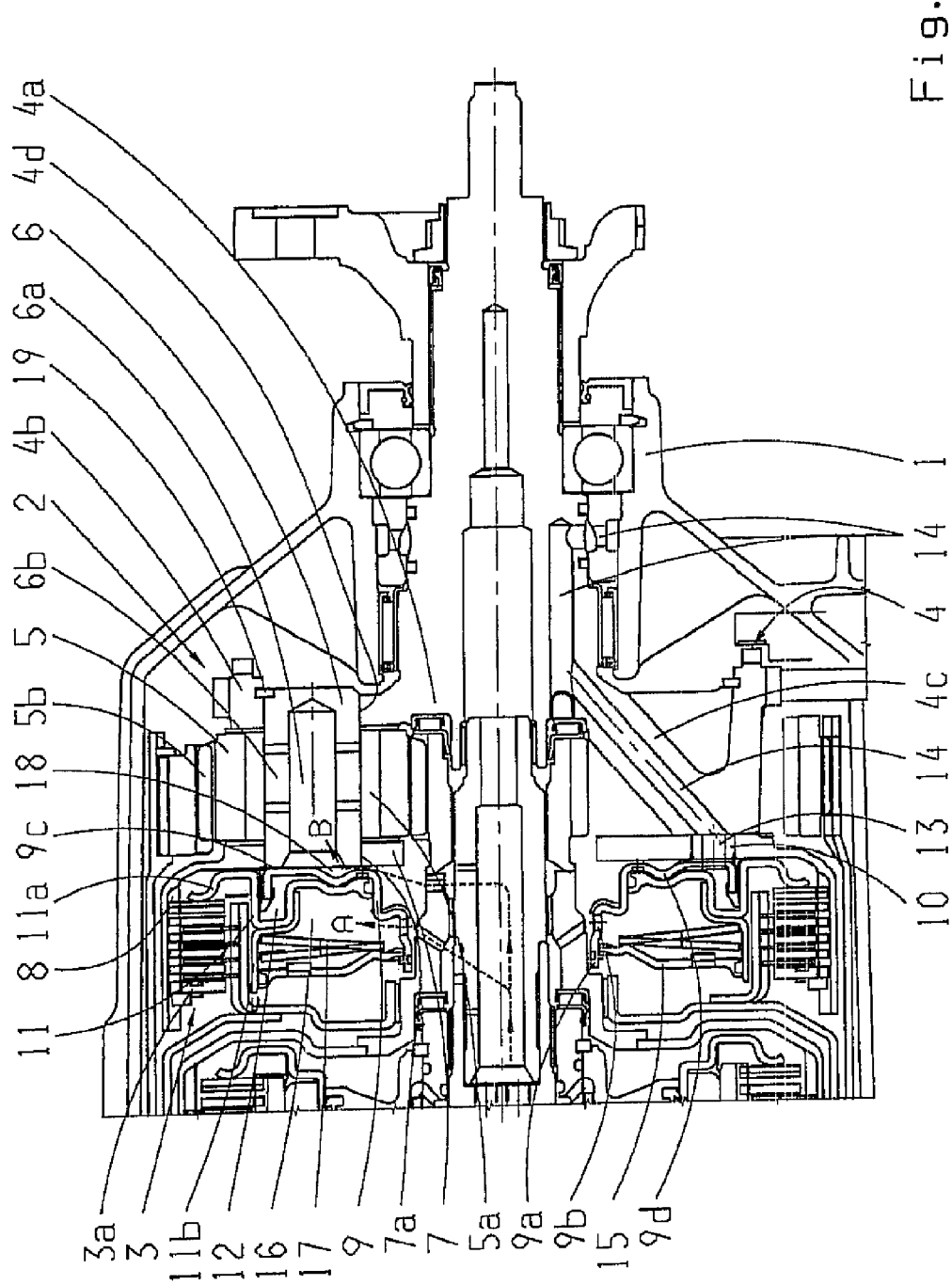
FIG. 1 is a planetary gearset with an adjacent shift element (first example embodiment of the invention)

FIG. 1 shows a section of a transmission housing 1 in which a planetary gearset 2 with an axially adjacent shift element 3 are arranged—the two components 2, 3 being parts of an automatic transmission (not fully shown) for a motor vehicle. The planetary gearset 2 comprises a planetary gear carrier 4 and planetary gears 5 mounted in the planetary gear carrier 4 by way of planetary gear bolts 6. The planetary gear bolts 6 have an axial blind bore 6a and radial bore 6b that serve to supply lubrication oil to the planetary gears 5, which are mounted on the bolts 6 by way of a slide or roller bearing 5a. The planetary gear carrier 4, referred to as the planetary carrier for brevity, has a hub 4a with which a first carrier plate 4b and a fixing arm 4c are connected (distributed around the circumference there are a plurality, in particular three respective carrier plates or carrier arms and fixing arms). In the first carrier plate 4b is arranged a bore 4d to receive the bolt 6. In addition, the planetary carrier 4 has a second carrier plate 7 arranged parallel to the first carrier plate 4b and connected in a rotationally fixed manner to the fixing arm 4c. The second carrier plate 7 has bores 7a to receive the planetary gear bolts 6. Preferably, around the circumference of the planetary gearset 2, three planetary gears 5 are mounted on the planetary carrier 4 by way of three bolts in such manner that the planetary gears 5 mesh with gears shown in the drawing, but not provided with indexes, namely an inner sun gear and an outer sun gear (ring gear). The second carrier plate 7 is connected to an outer disk carrier 8 of the shift element 3, for example by a weld joint (not shown) or even because they are made as one piece. With the outer disk carrier 8 are engaged outer disks of a disk set 3a which comprises alternatingly arranged inner disks engaged with an inner disk carrier (not indexed). To the second carrier plate 7, an annular cylinder 9 is attached at a bottom 9c thereof preferably by a rivet connection 10. An annular piston 11 is held by and can slide in the annular cylinder 9 with which it forms a pressure chamber 12. In bottom 9c of the annular cylinder 9 and in the second carrier plate 7, a through-bore 13 is arranged, which is connected, via pressure oil ducts 14, to a stationary pressure oil source (not shown). The annular piston 11, formed as a sheet component, has a radially outward-extending pressure ring 11a which is arranged in the area of the disk set 3a. The annular cylinder 9 has a radially inner, extended cylinder wall 9a in which a throughbore 9b is arranged. To the annular piston 11, a cylindrical extension 11b is attached within which is arranged a diaphragm plate 15 which, together with the cylinder wall 9a, the back of the annular piston 11 and the cylindrical extension 11b, forms a pressure equalization chamber 16 in which a cup spring 17 is arranged as the restoring spring for the piston 11. At one of its ends, the diaphragm plate 15 is held with positive interlock in the cylinder wall 9a and thus forms the support for the cup spring 17, while the other end of the diaphragm plate 15 is arranged and sealed so that it can slide within the cylindrical extension 11b. As indicated by the arrow A drawn with a broken line, the equalization chamber 16 is supplied with lubrication oil, i.e., not under pressure. The cylinder bottom 9c has an annular recess 9d which, with the second carrier plate 7, forms an annular lubrication oil chamber 18. This lubrication oil chamber 18 has a radially inner inlet in the form of a gap between the bottom cylinder wall 9a and the carrier plate 7 so that, as indicated by the broken-line arrow B, it can be supplied with lubrication oil which, in this way, passes, via the lubrication oil chamber 18, into the bore 6a of the planetary gear bolt 6 and, via the radial bores 6b, to the bearings 5a of the planetary gears 5.

One end surface of the planetary bolt 6 contacts the cylinder bottom 9c of the annular cylinder 9 and is thus held axially fixed in one direction by the annular cylinder 9. The end of the planetary bolt 6, remote from the annular cylinder 9, is secured by a securing ring 19 arranged in a groove of the planetary carrier 4. Thus, the planetary bolt 6 is axially secured in both directions. The function of the shift element 3 is basically as in the prior art: to engage the shift element 3, the pressure chamber 12 is supplied with pressure oil, via the ducts 14 and the throughbore 13 so that the annular piston 11 moves to the left in the drawing and presses with its outer pressure ring 11a against the disk set 3a so that the outer disk carrier 8 is frictionally coupled to the inner disk carrier. Since the annular cylinder 9 and thus also the pressure chamber 12 rotate, there is, in addition, a speed-dependent dynamic pressure component which is compensated by the oil pressure in the equalization chamber 16.

Figure 2:
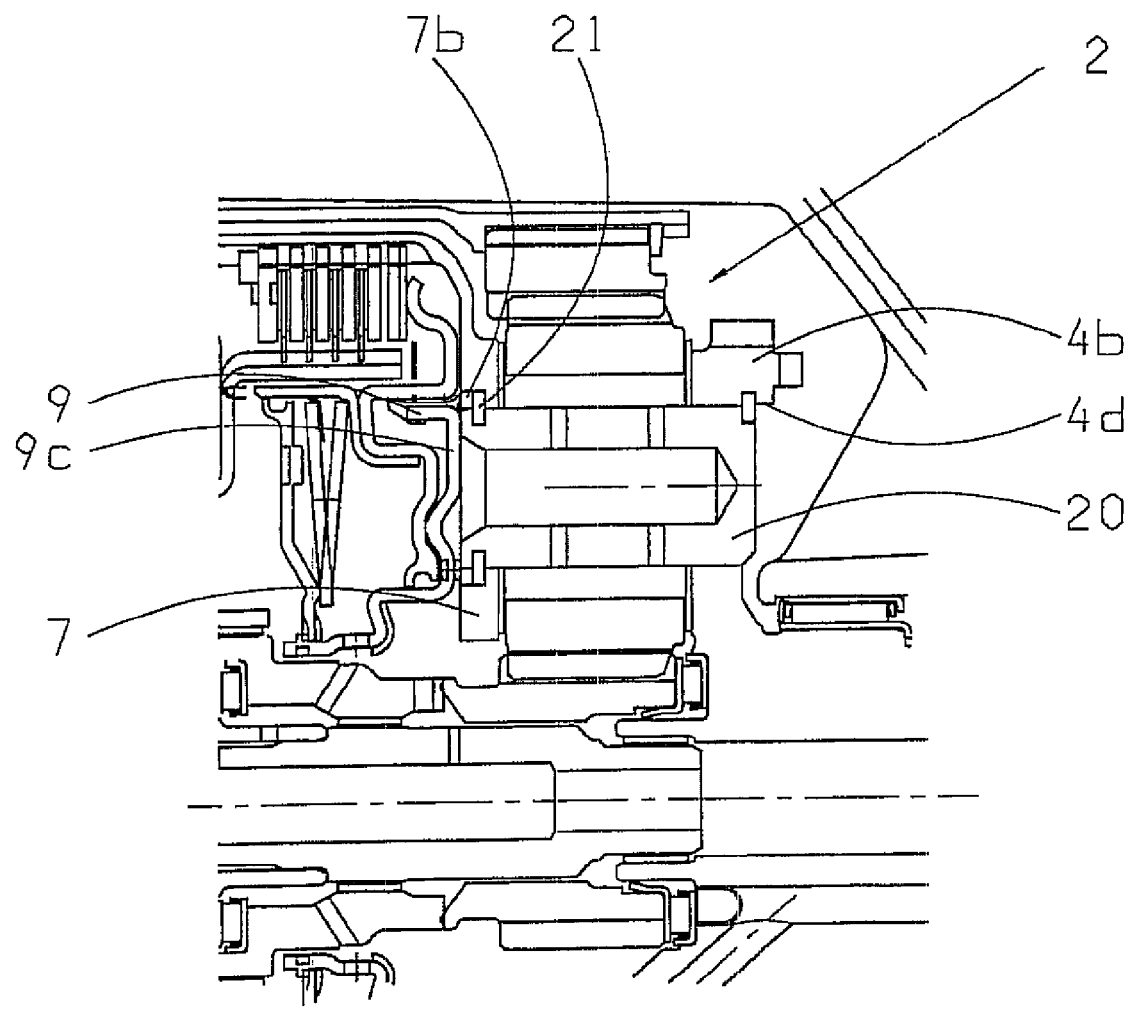
FIG. 2 is a section of a planetary gearset with an adjacent shift element (second example embodiment of the invention)

FIG. 2 shows another example embodiment of the invention, the same indexes as in FIG. 1 being used for the same components. The Figure shows an upper section of the planetary gearset 2 with a slightly modified gear bolt 20 whose axial fixing is not the same as in the example embodiment in FIG. 1. The planetary bolt 20 rests with its end face on the left in the drawing against the cylinder bottom 9c of the annular cylinder 9 and is secured by a securing ring 21 relative to the carrier plate 7, i.e., against axial displacement to the right (in the drawing). For this, a stepped bore 7b is provided in the carrier plate 7. The securing ring 20 is held in an annular groove in the planetary gear bolt 20. In contrast to FIG. 1, the annular groove with its securing ring are not present in the bore 4d of the carrier 4b.

Figure 3:
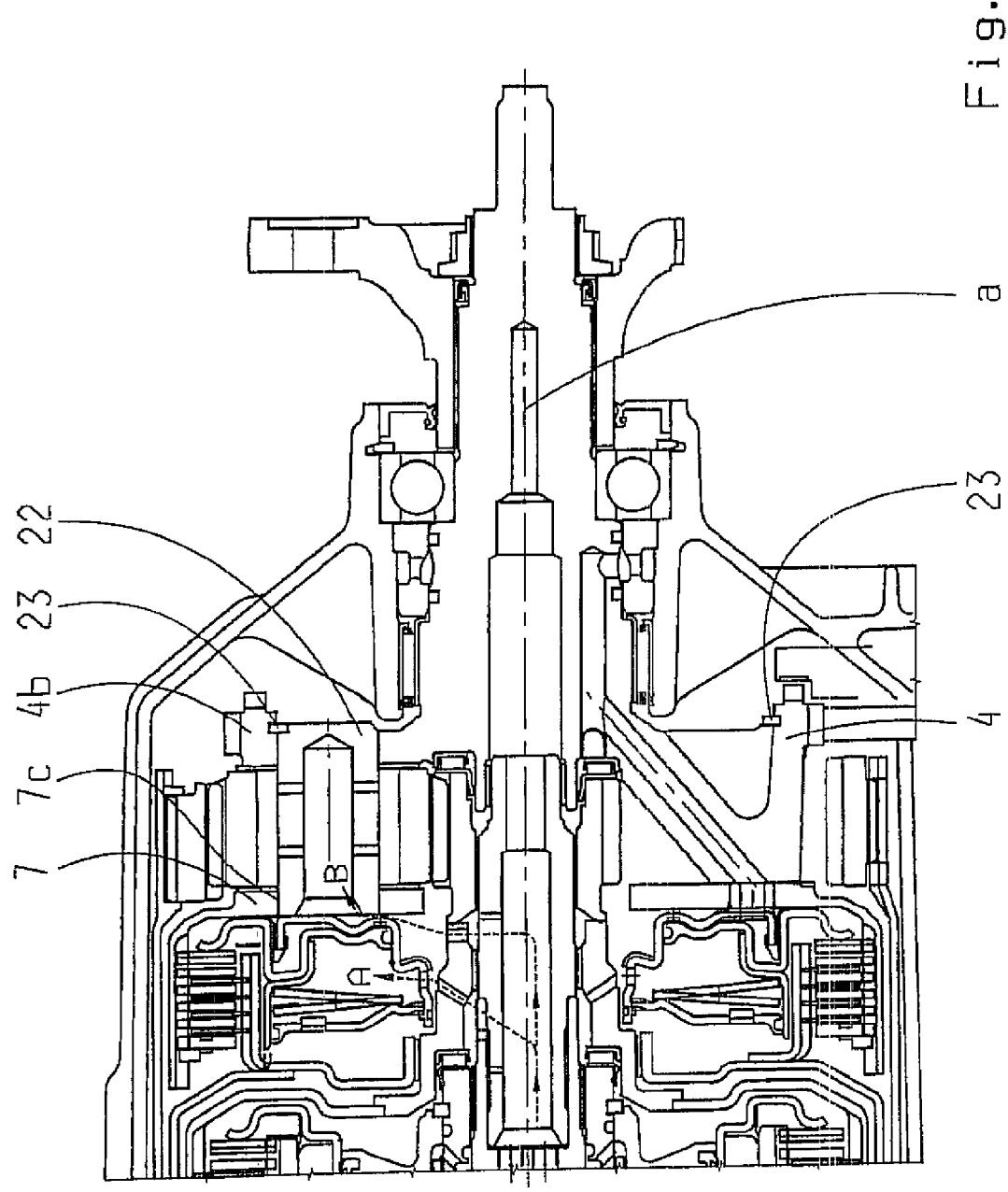
FIG. 3 is a planetary gearset with an adjacent shift element (third example embodiment of the invention)

FIG. 3 shows a further example embodiment of the invention, again with the same indexes for the same components. The Figure shows a further variation for axially fixing the planetary gear bolt 22, which is again fitted in bores in the two carrier plates 4b, 7. The second carrier plate 7 has a stepped bore 7c whose larger diameter (outer diameter of the planetary bolt) is on the side of the planetary gear 5. Thus, for the end face of the planetary gear bolt 22 on the left in the drawing, there is an axial abutment in the second carrier plate 7. On the other side, i.e., in the carrier 4b and the planetary carrier 4, a securing ring 23 is used, which is arranged co-axially with the rotation axis of a planetary carrier 4. Thus by way of the securing ring 23, all the planetary gear bolts 22, arranged around the circumference, are axially fixed.

Figure 4:
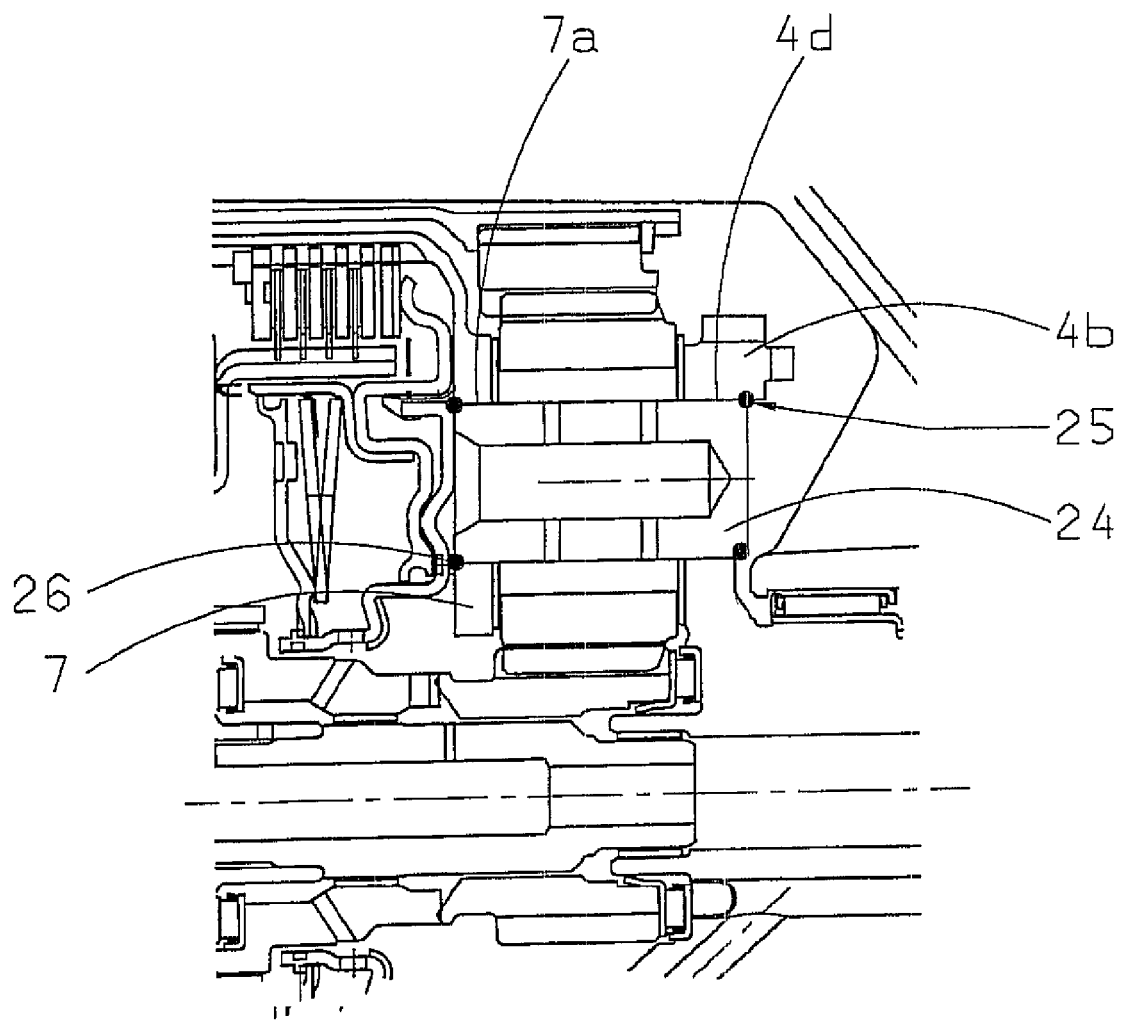
FIG. 4 is a section of a planetary gearset with an adjacent shift element (fourth example embodiment of the invention).

FIG. 4 shows still another example embodiment of the invention with modified axial fixing of a planetary gear bolt 24, the same components again being given the same indexes. The planetary bolt 24 is inserted into the carrier plates 4b and 7 through smooth through-bores 4d, 7a and crimped at the ends on both sides, as indicated respectively by dots 25, 26. Thus, the planetary bolt 24 is axially fixed in both directions.

| Reference numerals | |
|---|---|
| 1 | transmission housing |
| 2 | planetary gearset |
| 3 | shift element |
| 3a | disk set |
| 4 | planetary gear carrier |
| 4a | hub |
| 4b | first carrier plate |
| 4c | fixing arm |
| 4d | bore |
| 5 | planetary gear (planet) |
| 5a | bearing |
| 5b | teeth |
| 6 | planetary gear bolt |
| 6a | axial blind hole bore |
| 6b | radial bore |
| 7 | second carrier plate |
| 7a | bore |
| 7b | stepped bore |
| 7c | stepped bore |
| 8 | outer disk carrier |
| 9 | annular cylinder |
| 9a | cylinder wall |
| 9b | through-bore |
| 9c | cylinder bottom |
| 9d | annular recess |
| 10 | rivet joint |
| 11 | annular piston |
| 11a | pressure ring |
| 11b | cylindrical extension |
| 12 | pressure chamber |
| 13 | through-bore |
| 14 | pressure oil duct |
| 15 | diaphragm plate |
| 16 | pressure equalization chamber |
| 17 | cup spring |
| 18 | lubrication oil chamber |
| 19 | securing ring |
| 20 | planetary gear bolt |
| 21 | securing ring |
| 22 | planetary gear bolt |
| 23 | securing ring |
| 24 | planetary gear bolt |
| 25 | crimping |
| 26 | crimping |

The invention claimed is:

1. A planetary gearset comprising a planetary gear carrier (4) having first and second carrier plates (4b, 7) which support a plurality of planetary gears (5), each of the first and the second carrier plates (4b, 7) having respective bores (4d, 7a) for receiving planetary gear bolts (6) that are axially fixed therein;

the planetary gear carrier (4) being connected in a rotationally fixed manner by the second carrier plate (7) to a torque-transmitting disk carrier (8) of an adjacent shift element (3); and an annular cylinder (9) being connected in a rotationally fixed manner to the second carrier plate (7), the annular cylinder (9) transmits no torque and co-operates with an annular piston (11) to form a pressure chamber (12) associated with the shift element (3), such that the annular cylinder (9) forms an axial abutment for the planetary gear bolts (6).

2. The planetary gearset according to claim 1, wherein the annular cylinder (9) has a cylinder bottom (9c) with an annular recess (9d) which forms a lubrication chamber (18), an outlet side of the lubrication chamber (18) communicates with bearings (5a) of the plurality of planetary gears (5), and an inlet side of the lubrication chamber (18) communicates with a lubrication oil supply located radially inside the lubrication chamber (18).

3. The planetary gearset according to claim 1, wherein the annular cylinder (9) has a radially inner, extended cylinder wall (9a) which, together with a back of the annular piston (11), forms a pressure equalization chamber (16), and the annular piston (11) communicates with the shift element (3).

4. The planetary gearset according to claim 3, wherein the extended cylinder wall (9a) of the annular cylinder (9) has a through-bore (9b) through which the pressure equalization chamber (16) is supplied with lubrication oil.

5. The planetary gearset according to claim 1, wherein on a side of the planetary gear bolts (6) remote from the annular cylinder (9), the planetary gear bolts (6) are axially fixed by a securing ring (19) in the planetary gear carrier (4).

6. The planetary gearset according to claim 1, wherein the annular cylinder (9) is attached to the second carrier plate (7) by a rivet joint (10).

7. The planetary gearset according to claim 1, wherein the pressure chamber (12) associated with the shift element (3) is supplied with pressurized oil via a through bore (13) in the second carrier plate (7) and ducts (14) in the planetary gear carrier (4).

8. The planetary gearset according to claim 1, wherein the shift element (3) comprises a disk set (3a) and the annular piston (11) comprises an outer pressure ring (11a), and the disk set (3a) is compressed in an axial direction by the pressure ring (11a).

9. A planetary gearset comprising a planetary gear carrier (4) comprising first and second carrier plates (4b, 7) for supporting a plurality of planetary gears (5), each of the first and the second carrier plates (4b, 7) having respective bores (4d, 7a) for receiving planetary gear bolts (22) that are axially therein, the planetary gear carrier (4) being connected in a rotationally fixed manner by the second carrier plate (7) to a torque-transmitting disk carrier (8) of an adjacent shift element (3);

an annular cylinder (9) being connected in a rotationally fixed manner to the second carrier plate (7), and the annular cylinder (9) being connected with an annular piston (11) to form a pressure chamber (12) associated with the shift element (3); and the second carrier plate (7) having a stepped bore (7c) which axially abuts with the planetary gear bolt (22).

10. The planetary gearset according to claim 9, wherein the planetary gear bolts (20) are axially fixed in the second carrier plate (7) by a securing ring (21), which is located at a side of the gear bolts (20) facing the annular cylinder (9).

11. The planetary gearset according to claim 9, wherein the planetary bolts (24) are axially secured in the first and the second carrier plates (4b, 7) by a crimping (25, 26) around an outer circumference of end faces the first and the second carrier plates (4b, 7).

12. A planetary gearset comprising:

a planetary gear carrier (4) having a first carrier plate (4b) and a second carrier plate (7), the first carrier plate (4b) having a plurality of bores (4d) and the second carrier plate (7) having a plurality of bores (7a) being axially aligned with a respective one of the plurality of bores (4d) of the first carrier plate (4b), and the second carrier plate (7) radially supports an outer disk carrier (8) of a shift element (3);

a plurality of planetary gear bolts (6) axially extend between the first carrier plate (4b) and the second carrier plate (7) and each of the plurality of planetary gear bolts (6) being supported by the axially aligned bores (4d, 7a) of the first carrier plate (4b) and the second carrier plate (7);

a planetary gear (5) being rotationally supported between the first carrier plate (4b) and the second carrier plate (7) on each one of the plurality of planetary gear bolts (6);

an annular cylindrical member (9) being fixed to a side of the second carrier plate (7), opposite a side facing the first carrier plate (4b), such that the annular cylindrical member (9) prevents axial movement of the planetary gear bolts (6) in one direction and one of securing ring (19, 21, 23) and a crimp (25, 26) communicates with the planetary gear bolts (6) to prevent axial movement of the planetary gear bolts (6) in an opposed direction; and an annular piston (11) slidably engaging the annular cylindrical member (9) to define a pressure chamber (12) therebetween, and the annular piston (11) communicating with the shift element (3) such that the annular piston (11) actuates the the shift element (3) when the pressure chamber (12) is pressurized.

* * * * *